UNITED STATES PATENT OFFICE

2,587,340

ESTERS OF ALKANEPHOSPHONIC ACIDS

Allen H. Lewis, Berkeley, and Richard D. Stayner, Albany, Calif., assignors to California Research Corporation, San Francisco, Calif., a corporation of Delaware No Drawing. Application February 4, 1948, Serial No. 6,345

4 Claims. (Cl. 260—461)

This invention relates to certain esters of long chain alkanephosphonic acids having oxyalkylene radicals and more particularly to such esters having a terminal hydrogen atom or alkyl group attached to oxyalkylene radicals and to their methods of preparation.

Recent advances in the field of surface active compounds and more specifically in the fields of detergents, wetting agents, and emulsifiers, have stressed the union of hydrophobic and hydrophilic radicals to yield compounds having desirable surface active properties. It is generally known that long chain radicals of an aliphatic hydrocarbon structure exhibit hydrophobic properties, whereas radicals derived from various oxygen acids such as those prepared from sulfur, phosphorous and the like have hydrophilic properties. The correct combination of a hydrophobic radical and hydrophilic radical to yield a compound of desired properties does not, however, follow any simple rule, such, for example, as addition of the respective properties of the individual radicals in the compound.

It is an object of this invention to produce novel compounds.

It is also an object of this invention to produce novel esters of long chain alkanephosphonic acids.

A further object is to produce novel compounds with a combination of radicals having valuable surface active properties.

Other objects are readily apparent in the description of this invention as hereinafter presented.

We have now discovered that a novel class of compounds consisting of oxyalkylene esters of long-chain alkanephosphonic acids in which an alkyl group containing 10–18 carbon atoms is attached to the phosphorus atom by a carbon to phosphorus bond and further characterized by the presence of an ester grouping containing one or more oxyalkylene divalent radicals, possesses valuable wetting, emulsifying and allied properties. These oxyalkylene esters of the long-chain alkanephosphonic acids may contain mono- or polyoxyalkylene divalent radicals to which are attached as terminal functional groups either an alkyl radical or a hydrogen atom and may be designated specifically as the alkyloxyalkylene, hydroxyalkyloxyalkylene and hydroxyalkyl esters.

In general, the oxyalkylene radical will contain at least 2 carbon atoms. These esters are to be understood as inclusive of the neutral diesters, as well as the half esters, in which the residual replaceable hydrogen of the alkanephosphonic acid may remain or be replaced by a metal such as an alkali metal.

Although in its simplest form these esters are shown to contain oxyalkylene radicals in a straight chain, it is to be understood that substituted oxyalkylene radicals are also contemplated within the scope of the invention. Those oxyalkylene radicals which contain one or more hydrogen substituents in the form of an alkyl group produce branched chain ester groupings which are to be understood as included in the scope of the esters of the invention.

Our novel ester compounds of long chain alkanephosphonic acids containing at least one oxyalkylene radical may, for example, be derived from mono-alkyl ethers of ethylene glycol, mono-alkyl ethers of diethylene glycol, and also from mono-alkyl ethers of triethylene glycol, as well as from the mono-alkyl ethers of other polyethylene glycols in general. Compounds of this invention with oxyalkylene ester radicals of molecular weights up to about 600 possess valuable properties. The number of oxyalkylene groups in the ester radical accordingly is not a limiting factor. Also, we may use the mono-alkyl ethers of propylene glycol or the di- or tri-propylene glycols and of other polypropylene glycols. When we use the hereinabove presented mono-alkyl ethers of the said glycols, we obtain ester compounds having an alkyloxyalkylene radical. And by an alkyloxyalkylene radical we mean a radical characterized by the presence of a terminal alkyl group linked to the oxyalkylene radical through the oxygen atom. And by the term oxyalkylene, we mean the divalent radical characterized by —$(CR_2)_nO$— wherein $n$ is a whole number of 2 to about 5, and R is selected from the group consisting of hydrogen and alkyl groups. Compounds such as butylene glycol, trimethylene glycol, tetramethylene glycol and alkyl substituents thereof yield esters within the scope of our invention.

Furthermore, in lieu of the mono-alkyl ethers of the ethylene and polyethylene glycols, and the propylene and polypropylene glycols, we may use the polyalkylene glycols per se, thereby obtaining the corresponding ester of alkanephosphonic acid having a hydroxyalkyloxyalkylene radical in the ester grouping. And by the term hydroxyalkyloxyalkylene radical we mean a radical characterized by a hydroxy group attached to the terminal alkyl group of the hereinabove defined alkyloxyalkylene radical.

In those cases where our ester compounds contain but individual oxyalkylene divalent radicals, as distinguished from the polyoxyalkylene divalent radicals, we obtain the corresponding esters having hydroxyalkyl groups. These hydroxyalkyl esters, as well as hydroxyalkyloxyalkylene esters, we have discovered, are easily prepared by reacting long chain alkanephosphonic acids with an olefin oxide under suitable reaction conditions.

Our novel esters of the long-chain alkanephosphonic acids having more than one consecutive oxyalkylene radical therein may, for example, be prepared by reacting the corresponding long chain alkanephosphonyl dichloride with a compound having a polyoxyalkylene radical containing a terminal hydroxyl group, viz., a hydroxypolyoxyalkylene compound. In this reaction hydrogen chloride is formed, as well as the desired corresponding ester, thereby necessitating means for removal of said hydrogen chloride.

In this connection, it is to be noted that the preparation of compounds having a long-chain alkyl group of about 10 carbon atoms or more attached to a phosphorus atom has been difficult of accomplishment until quite recently. However, a method for preparing such compounds easily has recently been discovered. In this novel method phosphorus trichloride is reacted with long-chain aliphatic compounds in the presence of oxygen to yield a long-chain alkanephosphonyl dichloride having the long-chain alkyl group attached to the phosphorus atom by a primary, or preferentially by a secondary or tertiary carbon atom.

The method of carrying out this reaction is quite simple and comprises mixing the long-chain hydrocarbon with phosphorus trichloride and thereafter bubbling oxygen through the mixture, tne temperature being maintained at about 20° C. to about 60° C., until the reaction is complete. The reaction mixture is then subjected to reduced pressure distillation to remove unreacted long-chain hydrocarbon and any phosphorus oxychloride which may have been prepared and, lastly, the desired long-chain alkanephosphonyl dichloride is distilled over, also under reduced pressure.

In preparing our long-chain alkanephosphonyl dichlorides, we may use normal straight chain or branched chain aliphatic hydrocarbon compounds. And while we may use substantially pure species of hydrocarbon compounds to form our long chain alkanephosphonyl dichlorides, we may nevertheless advantageously use mixed aliphatic hydrocarbons. Thus, petroleum fractions such as the kerosene, gas oil and similar fractions, hydrogenated olefin polymers and hydrogenated Fischer-Tropsch olefins react with phosphorus trichloride in the presence of oxygen to yield the desired aliphatic long chain alkanephosphonyl dichlorides.

In the preparation of our novel ester compounds by a preferred procedure, one mole of long-chain alkanephosphonyl dichloride is added to a mixture comprising at least 2 moles of oxyalkylene compound admixed with a substance capable of neutralizing the hydrochloric acid formed in the reaction, such as amines, pyridine, or the nitrogen bases in general, or other alkaline substances. Another method of preparing our novel esters consists in mixing long-chain alkanephosphonyl dichloride and the oxyalkylene compound at low temperatures with constant removal of the hydrogen chloride formed either by means of vacuum, or alternately by a gas stream of air, nitrogen or other inert gas.

In a method of preparing our novel hydroxyalkyl and hydroxyalkyloxyalkylene esters, we may, for example, react long-chain alkanephosphonic acids with an olefin oxide, for example, ethylene oxide, propylene oxide or butylene oxide, to yield esters having oxyalkylene radicals in the molecule with a hydrogen atom attached to the terminal oxygen atom. For purposes of illustration, some of these ester compounds may, for example, be shown by the following equation:

wherein "$n$" is an integer of 1 to 10, $R'$ is a long-chain alkyl of preferably 10 to 18 carbon atoms, and $R^2$ and $R^3$ represent hydrogen and short chain alkyl groups.

The reaction of alkylene oxides with alkanephosphonic acids may be carried out at atmospheric pressures, and the reaction temperature may be varied between the limits of 20°–200° C. In the preparation of polyglycol esters, a surface catalyst may be used advantageously to increase the reaction rate, or other catalysts such as sulfuric acid, phosphoric acid, nickel sulfate, boron trifluoride, alkyl sulfates, sodium, tertiary amines, etc., may be employed.

As previously stated, the half-esters of our novel compounds are also within the scope of our invention. These half-esters may, for example, be prepared by reacting molar amounts of hydroxy compounds, having an oxyalkylene radical and hydrogen or alkyl groups attached to the terminal oxygen atom, with long-chain alkanephosphonyl dichloride, dissolved in a solvent such as acetone or the like, to yield the corresponding ester monochloride which latter, on hydrolysis, yields the corresponding acid ester. The acid esters, on neutralization by ordinary procedures, yield the corresponding salts of the half-esters.

We have also discovered that the novel esters of our invention are effective wetting and/or emulsifying and/or penetrating and/or dispersing and/or detergency agents. Also, we have discovered that these novel compounds may be used efficiently as oil additives, textile treating agents, plasticizers and the like. By way of illustration of the esters of our invention, we submit the following examples:

*Example 1.—Monomethyl ether of ethylene glycol ester of octadecanephosphonic acid*

37.1 parts of octadecanephosphonyl dichloride were added gradually to a mixture of 17 parts monomethyl ether of ethylene glycol and 30 parts of pyridine. After reaction the mixture was allowed to stand for 15 minutes, it was warmed on a steam bath for 20 minutes. The reaction mixture was then cooled, diluted with 10 parts of water and acidified with HCl. The upper oily layer was extracted with 25 parts of ether and washed with 50 parts of a half-saturated solution of sodium sulfate. The ethereal extract was dried and the solvent was evaporated to give a light-colored oil which was very slightly soluble in water. The material possessed the formula:

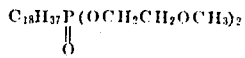

Analysis of the ester:

Calculated phosphorus content_____ 6.90
Found phosphorus content_____ 7.36

This compound may be distilled with slight decomposition under reduced pressure at 220–225° C. at 3 mm.

*Example 2.—Monobutyl ether of diethylene glycol ester of tetradecanephosphonic acid*

33 parts of tetradecanephosphonyl dichloride were added gradually to a mixture of 36 parts of monobutyl ether of diethylene glycol and 30 parts of pyridine. After reaction the ester product was obtained in the same manner as that outlined in Example 1. This product was a viscous, light-colored liquid which was slightly soluble in water and possessed the following formula:

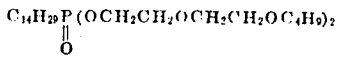

Analysis of the ester:

Calculated phosphorus content_____ 5.48
Found phosphorus content_____ 5.22

This compound may be distilled with slight decomposition under reduced pressure at 230–234° C. at 3 mm.

*Example 3.—Triethylene glycol ester of octadecanephosphonic acid*

37.1 parts of octadecanephosphonyl chloride were added gradually to a mixture of 37.5 parts of triethylene glycol and 30 parts of pyridine. After reaction the ester product was obtained in the same manner as that outlined in Example 1. The product was a thick syrupy liquid which had the following formula:

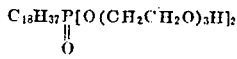

The product on analysis gave:

Phosphorus found_____ 5.6
Phosphorus calculated_____ 5.2

*Example 4.—Ethylene glycol ester of n-hexadecanephosphonic acid*

80 parts of n-hexadecanephosphonic acid were treated portionwise with 30 parts of ethylene oxide. The reaction mixture was allowed to warm to 35° C. at which temperature it was maintained for 30 minutes. The excess ethylene oxide was removed by warming the reaction mixture under reduced pressure to 95° C. The product had the formula:

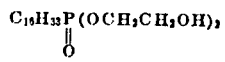

Analysis:
Calculated phosphorus _____ percent__ 7.9
Found _____ do_____ 7.7
Calculated hydroxyl number _____ 284
Found hydroxyl number _____ 280

*Example 5.— Pentaethylene glycol ester of n-octadecanephosphonic acid*

An autoclave was charged with 66.8 parts of n-octadecanephosphonic acid, 90 parts of ethylene oxide and 15 parts of aluminum hydrosilicate. The autoclave was sealed and then heated slowly to 150° C. and maintained at 150–155° C. until the pressure became constant. The produce was cooled and filtered to give 155 parts of a straw-colored liquid which has the following formula:

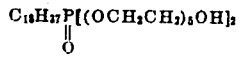

Analysis:
Per cent
Calculated phosphorus _____ 3.9
Found phosphorus _____ 4.0

The following Table I tabulates the wetting activity of some of our compounds. The tests for wetting activity were performed by noting the time in seconds required for a 1-square-inch sample of standard #6 canvas to sink to the bottom when placed on the surface of 200 ml. of solution in a 250 ml. beaker.

TABLE I.—EVALUATION OF WETTING ACTIVITY OF VARIOUS ESTERS OF VARIOUS ALKANEPHOSPHONIC ACIDS. WETTING TIMES IN SECONDS OF 0.5% AQUEOUS SOLUTIONS OF VARIOUS ESTERS OF VARIOUS ALKANEPHOSPHONIC ACIDS

| Formula | Long Chain Alkyl=R | | | |
| --- | --- | --- | --- | --- |
| | $C_{12}H_{25}$ | $C_{14}H_{29}$ | $C_{16}H_{33}$ | $C_{18}H_{37}$ |
| $RPO(OCH_2CH_2OH)_2$ | 3.6 | 5.1 | 7.8 | 25.8 |
| $RPO[(OCH_2CH_2)_2OH]_2$ | 5.0 | 13.4 | 12.2 | 25.8 |
| $RPO[(OCH_2CH_2)_3OH]_2$ | 4.8 | 6.0 | 13.3 | 26.2 |
| $RPO[(OCH_2CH_2)_4OH]_2$ | | | 13.4 | |
| $RPO[(OCH_2CH_2)_5OH]_2$ | | 8.5 | | 26.6 |
| $RPO(OCH_2CHOH)_2$ <br>               $CH_3$ | 4.1 | 5.6 | 9.8 | 19.0 |
| $RPO(OCHCH_2OCH_2CHCH_3)_2$ <br>     $CH_3$        $OH$ | 5.6 | 9.3 | 18.4 | 54.6 |
| $RPO(OCH_2CH_2OCH_3)_2$ | 4.7 | 6.0 | 12.3 | 18.4 |
| $RPO(OCH_2CH_2OCH_2CH_3)_2$ | 24.4 | 23.6 | | |
| $RPO(OCH_2CH_2OCH_2CH_2OCH_3)_2$ | 4.3 | 4.1 | 10.0 | 15.4 |
| $RPO(OCH_2CH_2OCH_2CH_2OC_4H_9)_2$ | 27.8 | 79.6 | 119.0 | 148.0 |
| $RPO(ONa)(OCH_2CH_2OCH_2CH_3)$ | 20.0 | 179.0 | | |
| $RPO(ONa)(OCH_2CH_2OCH_2CH_2OC_4H_9)$ | 85.0 | 148.0 | | |

The following Table II tabulates the emulsifying activity of some of our compounds. In these emulsification tests the prepared samples were shaken vigorously by hand, set aside and observed at regular time intervals.

TABLE II.—EVALUATION OF THE EMULSIFYING ACTIVITY OF VARIOUS ESTERS OF VARIOUS ALKANEPHOSPHONIC ACIDS

| Formula | Long Chain Alkyl=R | | | |
|---|---|---|---|---|
| | $C_{12}H_{25}$ | $C_{14}H_{29}$ | $C_{16}H_{33}$ | $C_{18}H_{37}$ |
| $RPO(OCH_2CH_2OH)_2$ | [1] 2.5 | 2.5 | 0.5 | 0.5 |
| $RPO(OCH_2CH_2)_2OH]_2$ | 2.5 | 1.5 | 0.25 | 0.5 |
| $RPO(OCH_2CHOHCH_3)_2$ | 2.5 | 0.5 | 0.5 | 0.5 |
| $RPO(OCHCH_2OCH_2CHOH)_2$<br>     \|           \|<br>    $CH_3$     $CH_3$ | 2.5 | 2.5 | 2.5 | 1.0 |
| $RPO(OCH_2CH_2OCH_2CH_2OCH_2CH_3)_2$ | 2.5 | 2.5 | 2.0 | 1.0 |

[1] Minimum concentration of emulsifying agent capable of stabilizing a mixture of xylene-water (50-50) by volume for 5 days.

The novel long-chain alkanephosphonic esters appearing in Tables I and II were prepared from novel long-chain alkanephosphonyl dichloride precursors as outlined previously herein and as more specifically illustrated below. All ester compounds illustrated in Tables I and II were prepared from pure normal straight chain hydrocarbons.

Illustrative example of preparation of a pure normal long chain alkanephosphonyl dichloride (viz., n-hexadecanephosphonyl dichloride):

A solution of 452 parts by weight of n-hexadecane (obtained from Connecticut Hard Rubber Co.) and 1000 parts by weight of phosphorus trichloride were placed in a reaction vessel equipped with a gas addition tube, water-cooled reflux condenser and a thermometer which dipped into the reaction mixture. The vessel was placed in a cold-water bath and oxygen was passed through the solution for six hours at such a rate that the temperature did not rise over 45° C. The reaction proceeds more rapidly if the oxygen is made to pass through a fritted-glass plate. The reaction temperature finally fell to that of the water bath thereby indicating completion of the chemical reaction. Any phosphoryl chloride formed in the reaction was evaporated under reduced pressure and the residue distilled for the desired product. The fraction boiling at 140–145° C. at 5 mm. pressure weighed 160 parts and was recovered excess n-hexadecane. The n-hexadecanephosphonyl dichloride weighed 197 parts and the boiling point was 200–215° C. at 5 mm. pressure.

In an analogous manner the normal dodecanephosphonyl dichloride, the normal tetradecanephosphonyl dichloride and the normal octadecanephosphonyl dichloride were obtained. As previously outlined, these long-chain phosphonyl dichlorides are precursors in the preparation of the esters presented in Tables I and II.

We claim:

1. A polyoxyalkylene ester of alkanephosphonic acid having a saturated alkyl group of from 10 to 18 carbon atoms attached to the phosphorus atom of said acid and at least one polyoxyalkylene group consisting of a series of from 2 to 5 oxyalkylene groups containing each from 2 to 4 carbon atoms, said oxyalkylene groups being consecutively joined to each other and attached to said phosphorus atom through an oxygen atom and terminating by a member of the group consisting of hydrogen and alkyl radicals of from 1 to 4 carbon atoms.

2. Monobutyl ether of diethylene glycol ester of tetradecanephosphonic acid.

3. Acyclic triethylene glycol ester of octadecanephosphonic acid, said ester having the formula

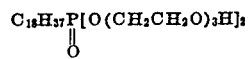

4. Acyclic pentaethylene glycol ester of octadecanephosphonic acid, said ester having the formula

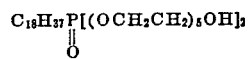

ALLEN H. LEWIS.
RICHARD D. STAYNER.

REFERENCES CITED

The following references are of record in the file of this patent:

UNITED STATES PATENTS

| Number | Name | Date |
|---|---|---|
| 2,268,157 | Marvel | Dec. 30, 1941 |
| 2,268,158 | Marvel | Dec. 30, 1941 |
| 2,311,306 | Ritchey | Feb. 16, 1943 |
| 2,365,466 | Hamilton | Dec. 19, 1944 |
| 2,382,622 | Toy | Aug. 14, 1945 |
| 2,436,141 | Goebel | Feb. 17, 1948 |